United States Patent
Tsuneki

(10) Patent No.: US 9,958,837 B2
(45) Date of Patent: May 1, 2018

(54) MOTOR CONTROL APPARATUS FOR CORRECTING INTERPOLATION ERROR OF POSITION DETECTOR

(71) Applicant: FANUC Corporation, Yamanashi (JP)

(72) Inventor: Ryoutarou Tsuneki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 14/614,752

(22) Filed: Feb. 5, 2015

(65) Prior Publication Data

US 2015/0220067 A1 Aug. 6, 2015

(30) Foreign Application Priority Data

Feb. 6, 2014 (JP) .................. 2014-021621

(51) Int. Cl.
*H02P 23/00* (2016.01)
*G05B 11/01* (2006.01)

(52) U.S. Cl.
CPC .................. *G05B 11/011* (2013.01)

(58) Field of Classification Search
CPC .................. G05B 19/19; G01D 3/02
USPC .......... 318/432, 560, 603; 375/371
See application file for complete search history.

(56) References Cited

U.S. PATENT DOCUMENTS

| | | | | |
|---|---|---|---|---|
| 4,792,739 A * | 12/1988 | Nakamura | .......... | G01D 3/02 318/616 |
| 5,023,924 A * | 6/1991 | Tajima | .......... | H02P 6/006 318/400.22 |
| 6,515,442 B1 * | 2/2003 | Okubo | .......... | G05B 19/19 318/560 |
| 2004/0085035 A1 * | 5/2004 | Tazawa | .......... | H02P 7/2805 318/432 |
| 2008/0001567 A1 * | 1/2008 | Iwashita | .......... | F16F 15/002 318/652 |
| 2009/0284208 A1 * | 11/2009 | Ikeda | .......... | G05B 19/19 318/621 |
| 2010/0091926 A1 * | 4/2010 | Kishibe | .......... | G01D 5/2448 375/371 |

(Continued)

FOREIGN PATENT DOCUMENTS

| CN | 102201771 A | 9/2011 |
|---|---|---|
| DE | 112006001287 T5 | 4/2008 |

(Continued)

*Primary Examiner* — Bickey Dhakal
*Assistant Examiner* — Cortez Cook
(74) *Attorney, Agent, or Firm* — Hauptman Ham, LLP

(57) ABSTRACT

A motor control apparatus includes a position detector for detecting the position of a rotor of a motor, a speed detection unit for calculating a speed detection value based on a position detection value detected by the position detector, a speed command generation unit for generating a speed command which commands a rotation speed of the rotor of the motor, a correction amount calculation unit for calculating a correction amount based on the position detection value detected by the position detector, a correction processing unit for correcting the speed detection value by using the correction amount, and a torque command generation unit for generating a torque command which commands a rotational torque of the motor based on the speed command and the speed detection value corrected by the correction processing unit.

4 Claims, 6 Drawing Sheets

(56) References Cited

U.S. PATENT DOCUMENTS

2012/0256575 A1  10/2012  Chien et al.
2014/0070752 A1* 3/2014  Otsuji .................. G05D 3/20
                                            318/603

FOREIGN PATENT DOCUMENTS

| JP | H11-259110 A | 9/1999 |
| JP | 2005-110344 A | 4/2005 |
| JP | 2008-236899 A | 10/2008 |
| WO | 2013/042237 A1 | 3/2013 |

* cited by examiner

MOTOR CONTROL APPARATUS FOR CORRECTING INTERPOLATION ERROR OF POSITION DETECTOR

RELATED APPLICATIONS

The present application claims priority to Japanese Application Number 2014-021621, filed Feb. 6, 2014, the disclosure of which is hereby incorporated by reference herein in its entirety.

BACKGROUND OF THE INVENTION

Field of the Invention

The present invention relates to a motor control apparatus comprising a position detector for detecting the position of a rotor of a motor.

Description of the Related Art

In order to detect the position of a rotor of a motor, a position detector such as a rotary encoder or a linear scale is provided in a motor control apparatus for controlling rotational drive of the motor. A position detection value detected and fed back by the position detector is utilized for generating a speed command or a torque command for a motor.

A position detector realizes a high resolving power by further electrically interpolating (dividing) a physical scale. Interpolation, however, has an error, and the error is generated every time a rotor of a motor rotates one time. A position detection error caused by an interpolation error thus cyclically appears in an output of a position detector. By the position detection error, a speed command or a torque command which is generated by a motor control apparatus cyclically oscillates, and as the result, noise is generated from a motor which is driven and controlled by the motor control apparatus, which is problematic. A position detection error varies depending on the process, structure, and properties of a position detector, and is specific to the position detector.

For example, Japanese Laid-open Patent Publication No. 11-259110 describes a technique in which, for the variation of a position detection error specific to a position detector, the frequency thereof is calculated and a notch filter including the frequency as the center frequency is applied thereto to correct the position detection error, thereby reducing an oscillation which is generated caused by the position detection error.

A position detector provided in a motor control apparatus has a cyclic position detection error caused by an interpolation error. Among the above commands, a torque command which is generated by a motor control apparatus using a position detection value including a position detection error cyclically oscillates, and therefore a noise is generated from a motor when rotational drive of the motor is controlled by using such a torque command.

The invention described in Japanese Laid-open Patent Publication No. 11-259110 has a function of correcting a position detection error in a position detector. However, an existing position detector not having such a correction function therein needs to be provided with the correction function therein in such a manner that the correction function is physically added thereto, and therefore, in some cases, it is difficult to add the correction function thereto or the cost increases depending on the structure of the position detector, which are problematic.

SUMMARY OF THE INVENTION

In view of the above-mentioned problems, an object of the present invention is to realize a motor control apparatus which can stably control a motor even when a position detection error specific to a position detector varies.

In order to realize the above-mentioned object, in a first aspect, a motor control apparatus includes a position detector for detecting the position of a rotor of a motor, a speed detection unit for calculating a speed detection value based on a position detection value detected by the position detector, a speed command generation unit for generating a speed command which commands a rotation speed of the rotor of the motor; a correction amount calculation unit for calculating a correction amount based on the position detection value detected by the position detector, a correction processing unit for correcting the speed detection value by using the correction amount, and a torque command generation unit for generating a torque command which commands a rotational torque of the motor based on the speed command and the speed detection value corrected by the correction processing unit.

In a second aspect, a motor control apparatus includes a position detector for detecting the position of a rotor of a motor; a speed detection unit for calculating a speed detection value based on a position detection value detected by the position detector, a speed command generation unit for generating a speed command which commands a rotation speed of the rotor of the motor, a torque command generation unit for generating a torque command which commands a rotational torque of the motor based on the speed command and the speed detection value, a correction amount calculation unit for calculating a correction amount based on the position detection value detected by the position detector, and a correction processing unit for correcting the torque command by using the correction amount.

In the first and second aspects, the correction amount calculation unit may be adapted to calculate the correction amount by synthesizing a plurality of sinusoidal waves each of which has a specific frequency component, an amplitude component, and an initial phase.

In the first and second aspects, each of the sinusoidal frequency components may be adapted to have a value which is natural number times a basic frequency determined by a rotation frequency of the motor and a physical scale number of the position detector.

In the first and second aspects, the correction amount calculation unit may be adapted to determine each sinusoidal wave which is synthesized in the calculation processing of a correction amount such that the difference between an error which is caused by an interpolation error for one rotation of the rotor which the position detector contains which is measured in advance and the correction amount is within a predetermined range.

BRIEF DESCRIPTION OF THE DRAWINGS

The present invention will be more clearly understood with reference to the following accompanying drawings.

DETAILED DESCRIPTION

A motor control apparatus for correcting an interpolation error of a position detector will now be described with reference to the drawings. It should be understood, however, that the present invention is not restricted to the drawings and Embodiments described below.

Figure 1:
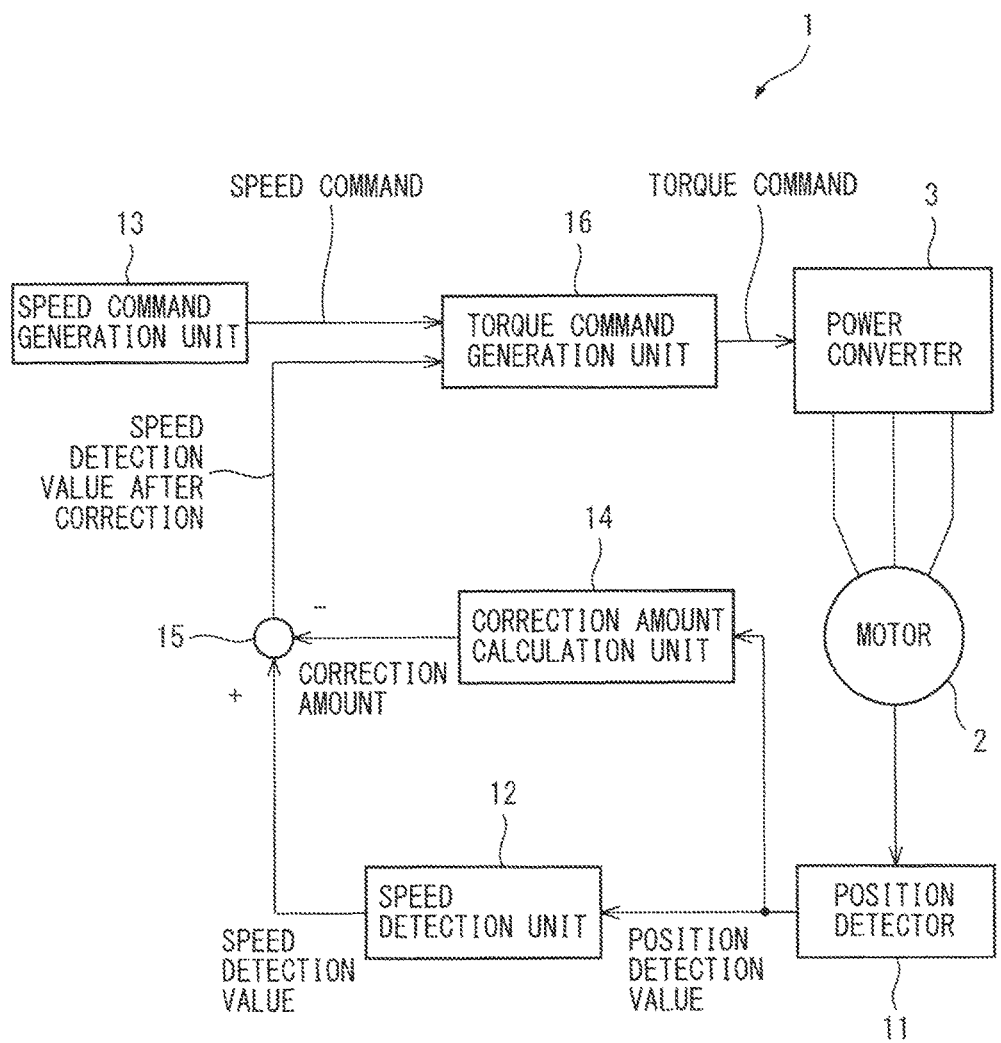
FIG. 1 is a block diagram illustrating a motor control apparatus of a first Embodiment.

FIG. 1 is a block diagram illustrating a motor control apparatus of the first Embodiment. Here, an example in which a motor 2 is rotationally driven by a motor control apparatus 1 will be explained. A driving power of the motor 2 is generated by a power converter 3. The power converter 3 is constituted by a conversion circuit (not illustrated) including a switching element therein such as a PWM inverter. The power converter 3 converts a direct-current power to a three-phase alternating current power having a desired voltage and a desired frequency for rotationally driving a motor 2 by allowing a switching element provided therein to perform switching operation based on a torque command generated by the motor control apparatus 1. The motor 2 operates based on a supplied voltage variable and frequency variable three-phase alternating current power.

The motor control apparatus 1 of the first Embodiment includes: a position detector 11 for detecting the position of a rotor of the motor 2; a speed detection unit 12 for calculating a speed detection value based on a position detection value detected by the position detector 11; a speed command generation unit 13 for generating a speed command which commands a rotation speed of the rotor of the motor 2; a correction amount calculation unit 14 for calculating a correction amount based on the position detection value detected by the position detector 11; a correction processing unit 15 for correcting the speed detection value by using the correction amount; and a torque command generation unit 16 for generating a torque command which commands a rotational torque of the motor based on the speed command and the speed detection value corrected by the correction processing unit 15. Specific examples of the position detector 11 include a rotary encoder or a linear scale.

Figure 2:
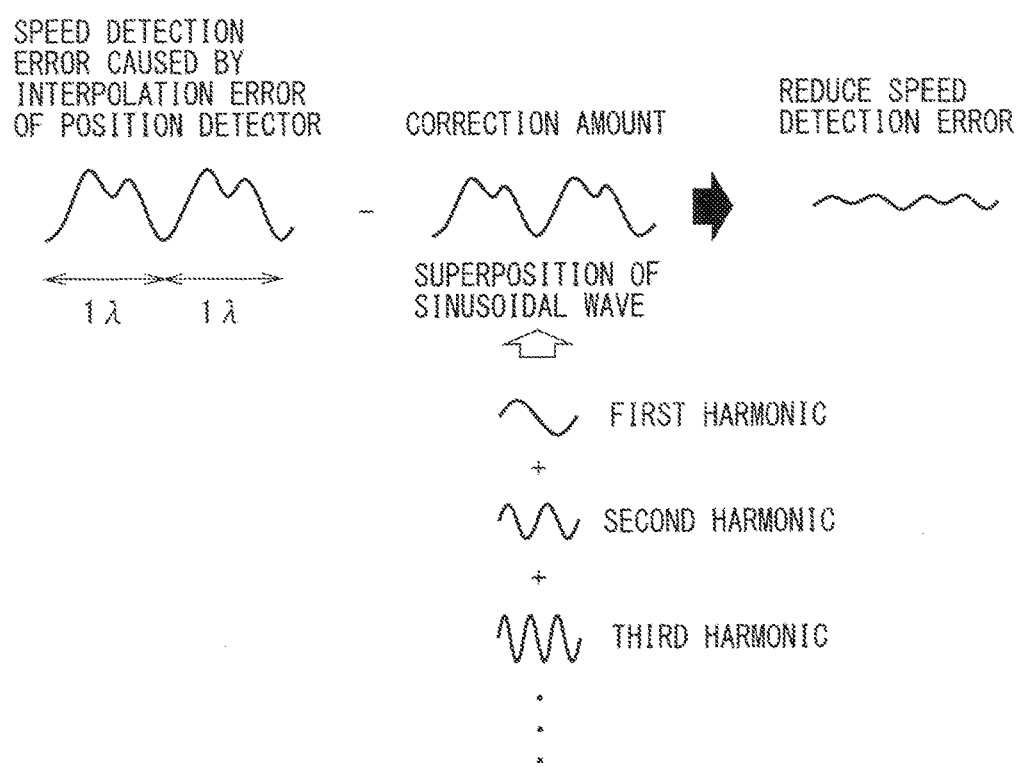
FIG. 2 is a drawing explaining operations of a correction amount calculation unit and a correction processing unit.

FIG. 2 is a drawing explaining operations of a correction amount calculation unit and a correction processing unit. As one example, operations of the correction amount calculation unit 14 and the correction processing unit 15 in cases in which a speed detection error caused by an interpolation error of the position detector 11 which is generated repeatedly in a cycle of λ is generated will be explained.

As mentioned above, in the position detector 11 which is provided in the motor control apparatus 1, a position detection error caused by an interpolation error is cyclically generated. Since the speed detection unit 12 generates a speed detection value by differentiating a position detection value containing a position detection error, a speed detection error is cyclically generated also in the speed detection value. Accordingly, in the first Embodiment, a speed detection error which is cyclically generated is modeled by synthesizing (superposing) a plurality of sinusoidal waves each of which has a specific frequency component, an amplitude component, and an initial phase, and the modeled value is used as a correction amount for cancelling a speed detection error contained in the speed detection value.

The correction amount calculation unit 14 calculates a correction amount by synthesizing a plurality of sinusoidal waves each of which has a specific frequency component, an amplitude component, and an initial phase. Each of these sinusoidal frequency components has a value which is natural times a basic frequency determined by a rotation frequency of a motor and physical scale number (for example, the physical scale number is the number of slits when the position detector 11 is a rotary encoder) of the position detector 11. The correction amount calculation unit 14 determines each sinusoidal wave which is synthesized in the calculation processing of a correction amount such that the difference between a speed detection error caused by an interpolation error which is generated repeatedly in a cycle of λ as illustrated in FIG. 2 and the correction amount is within a predetermined range. The correction amount, which is generated by the correction amount calculation unit 14, is represented by Formula 1:

$$\text{correction amount} = \sum_{n=1}^{m} g_n \sin(n\theta + \psi_n) \quad (1)$$

letting each of m, n be a natural number (1≤n≤m), $g_n$ be an amplitude component of an n-th harmonic, dθ/dt be a basic frequency, $\psi_n$ be an initial phase of the n-th harmonic.

In general, since an interpolation error of a position detector is specific to each position detector, a speed detection error caused by the interpolation error is measured in advance for the position detector 11 which is provided in the motor control apparatus 1 before the calculation processing of a correction amount by the correction amount calculation unit 14. For example, a speed command for allowing the motor 2 to rotate at a constant speed is imparted, and the difference between a measured position output from the position detector 11 and a position obtained by assuming that the motor moves at a constant speed is measured. $g_n$ and $\varphi_n$ which reproduce the measured speed detection error are determined. The correction amount calculation unit 14 creates a correction amount by using the $g_n$ and $\varphi_n$. In the correction amount calculation unit 14, the number of sinusoidal waves which can be superposed is increased until the difference between the speed detection error and the correction amount is within a predetermined range. More particularly, by increasing the natural number n in Formula 1 until the difference between the speed detection error and the correction amount is within a predetermined range, sinusoidal waves in the Formula 1 are determined, and the sinusoidal waves are superposed to calculate the correction amount.

The correction processing unit 15 corrects a speed detection value by using a correction amount calculated by the correction amount calculation unit 14. For example, the correction processing unit 15 reduces a speed detection error by subtracting, in the example illustrated in FIG. 2, a correction amount created by superposing a plurality of sinusoidal waves from the speed detection error caused by an interpolation error which is generated repeatedly in a cycle of λ.

The speed detection unit 12, the speed command generation unit 13, the correction amount calculation unit 14, the correction processing unit 15, and the torque command generation unit 16 may be constructed, for example, in a software program format, or may be constructed in a combination of a variety of electronic circuits and a software program. For example, when the speed detection unit 12, the speed command generation unit 13, the correction amount calculation unit 14, the correction processing unit 15, and the torque command generation unit 16 are constructed in a software program format, arithmetic processing units in the motor control apparatus 1 realize functions of the above-mentioned speed detection unit 12, speed command generation unit 13, correction amount calculation unit 14, correction processing unit 15, and torque command generation unit 16 by operating in accordance with the software program. The present invention can therefore be also applied to a motor control apparatus including an existing position detector by additionally installing software programs of the above-mentioned correction amount calculation unit 14 and correction processing unit 15 to the motor control apparatus.

Figure 3:
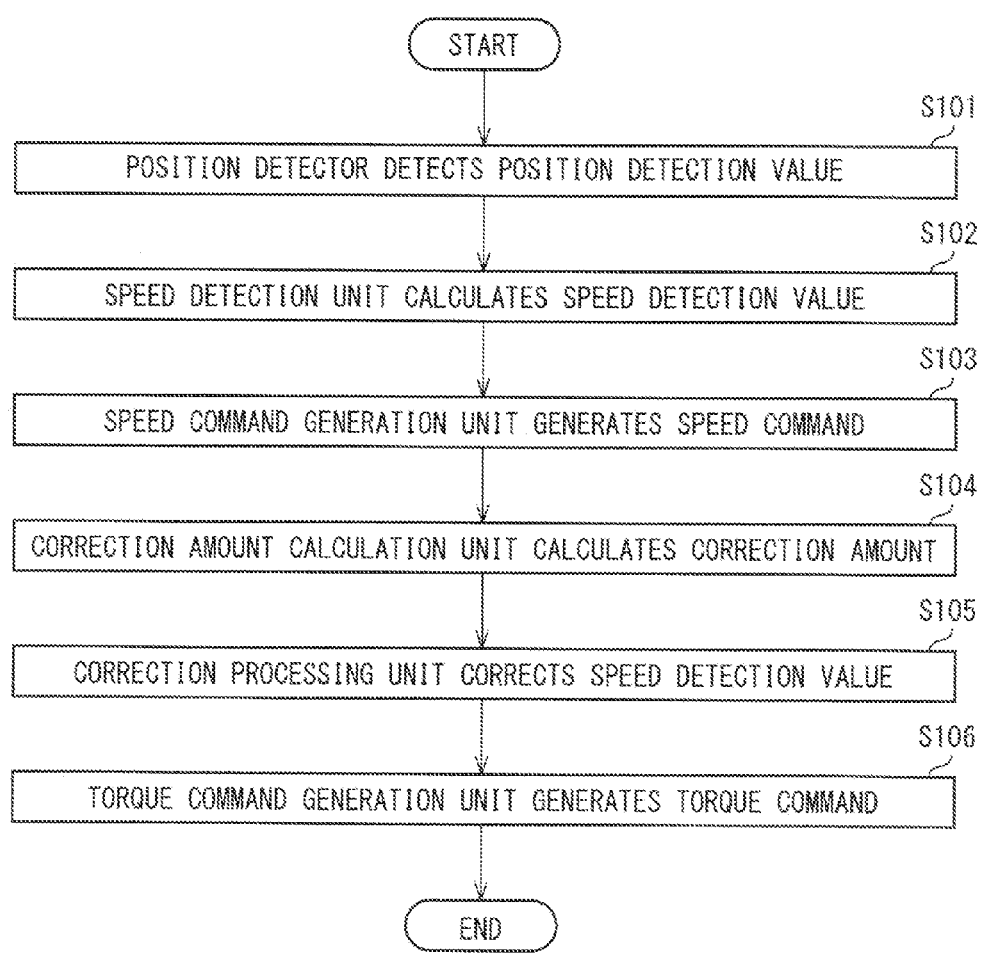
FIG. 3 is a flow chart illustrating an operational flow of a motor control apparatus 1 of the first Embodiment.

FIG. 3 is a flow chart illustrating an operational flow of a motor control apparatus 1 of the first Embodiment.

First, in a step S101, the position detector 11 detects the position of the rotor of the motor 2 which is rotationally driven based on a driving power which is supplied from the power converter 3.

Next, in a step S102, the speed detection unit 12 generates a speed detection value by differentiating a position detection value which is detected by the position detector 11.

In a step S103, the speed command generation unit 13 generates a speed command which commands a rotation speed of the rotor of the motor 2. The step S103, and the step S101 and the step S102 may be conducted by changing the order thereof.

In a step S104, the correction amount calculation unit 14 calculates a correction amount based on a position detection value which is detected by the position detector 11.

Next, in a step S105, the correction processing unit 15 corrects a speed detection value by subtracting the correction amount from the speed detection value. By this, a speed detection error is reduced.

Next, in a step S106, the torque command generation unit 16 generates a torque command which commands a rotational torque of the motor based on a speed command and the speed detection value corrected by the correction processing unit 15. Since the torque command is created by using a speed detection value after correction in which a speed detection error is reduced, a torque command error is reduced. Accordingly, since the motor 2 is allowed to rotate by a driving power which is output by the power converter 3 in which a power converting operation is controlled by the torque command, a noise of the motor which is conventionally caused by an interpolation error of the phase detector 11 is not generated.

Figure 4:
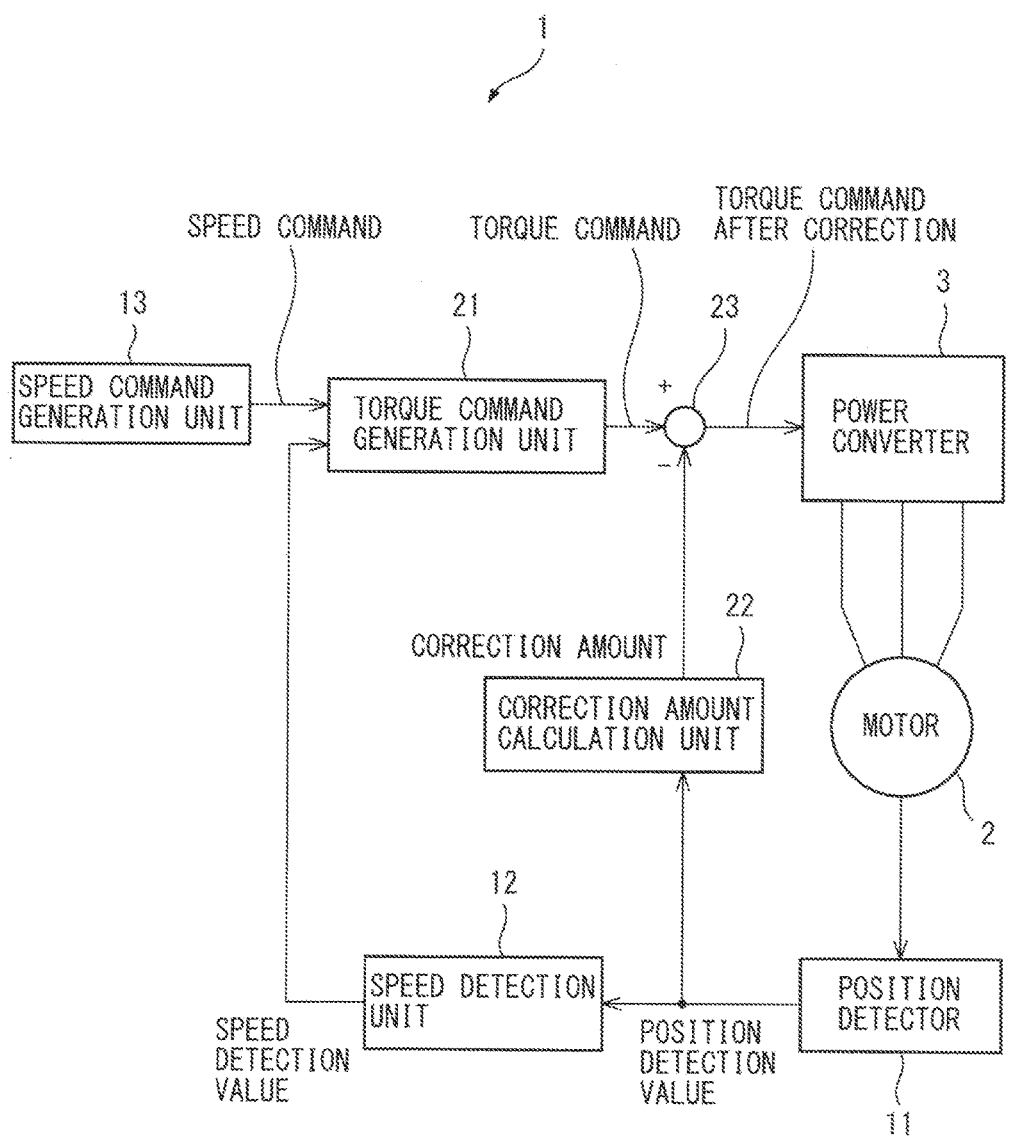
FIG. 4 is a block diagram illustrating a motor control apparatus of a second Embodiment.

Subsequently, the second Embodiment will be explained. In the second Embodiment, a torque command is corrected in place of the correction of a speed detection value in the above-mentioned first Embodiment. FIG. 4 is a block diagram illustrating a motor control apparatus of the second Embodiment. Also for the second Embodiment, in a similar manner to the above-mentioned first Embodiment, an example in which rotational drive of the motor 2 is controlled by the motor control apparatus 1 will be explained. In other words, a driving power of the motor 2 is generated by the power converter 3 which is constituted by a conversion circuit (not illustrated) including a switching element therein such as a PWM inverter. The power converter 3 converts a direct-current power to a three-phase alternating current power having a desired voltage and a desired frequency for driving a motor 2 by allowing a switching element provided therein to perform switching operation based on a torque command generated by the motor control apparatus 1. The motor 2 operates based on a supplied voltage variable and frequency variable three-phase alternating current power.

The motor control apparatus 1 of the second Embodiment includes: a position detector 11 for detecting the position of a rotor of a motor 2; a speed detection unit 12 for calculating a speed detection value based on a position detection value detected by the position detector 11; a speed command generation unit 13 for generating a speed command which commands a rotation speed of the rotor of the motor 2; a torque command generation unit 21 for generating a torque command which commands a rotational torque of the motor based on the speed command and the speed detection value; a correction amount calculation unit 22 for calculating a correction amount based on the position detection value detected by the position detector 11; and a correction processing unit 23 for correcting a torque command by using the correction amount. Specific examples of the position detector 11 include a rotary encoder or a linear scale.

Figure 5:
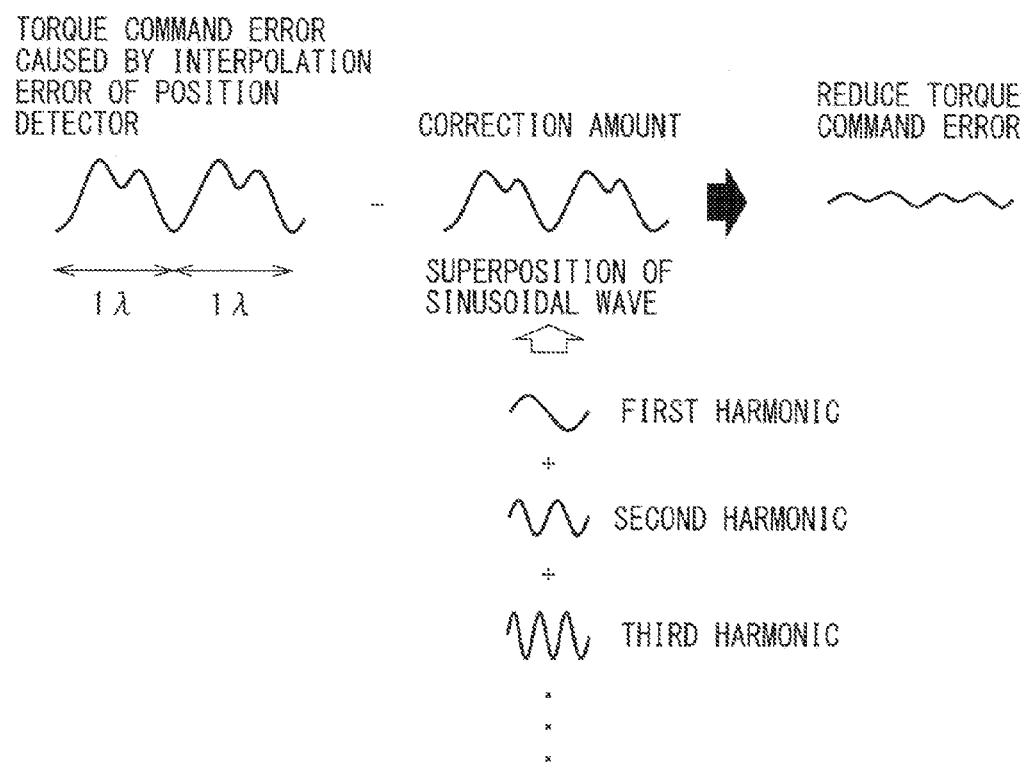
FIG. 5 is a drawing explaining operations of a correction amount calculation unit and a correction processing unit.

FIG. 5 is a drawing explaining operations of a correction amount calculation unit and a correction processing unit. As one example, operations of the correction amount calculation unit 22 and the correction processing unit 23 in cases in which a torque command error caused by an interpolation error of the position detector 11 which is generated repeatedly in a cycle of λ is generated will be explained.

As mentioned above, in the position detector 11 which is provided in the motor control apparatus 1, a position detection error caused by an interpolation error is cyclically generated. Since the speed detection unit 12 generates a speed detection value by differentiating a position detection value containing a position detection error, a speed detection error is cyclically generated also in the speed detection value. Since the torque command generation unit 21 generates a torque command which commands a rotational torque of the motor based on the speed command and a speed detection value containing a speed detection error, a torque command error is cyclically generated also in the torque command. In other words, since a position detection value containing a position detection error is used for creating the torque command, the torque command contains a torque command error caused by the interpolation error. Accordingly, in the second Embodiment, a torque command error which is cyclically generated is modeled by synthesizing (superposing) a plurality of sinusoidal waves each of which has a specific frequency component, an amplitude component, and an initial phase, and the modeled value is used as a correction amount for cancelling a torque command error contained in the torque command.

In a similar manner to the case of the correction amount calculation unit 14 in the above-mentioned first Embodiment, the correction amount calculation unit 22 calculates a correction amount by synthesizing a plurality of sinusoidal waves each of which has a specific frequency component, an amplitude component, and an initial phase. Each of these sinusoidal frequency components has a value which is natural times a basic frequency determined by a rotation frequency of a motor and physical scale number of the position detector 11. The correction amount calculation unit 22 determines each sinusoidal wave which is synthesized in the calculation processing of a correction amount such that the difference between a torque command error caused by an interpolation error which is generated repeatedly in a cycle of λ as illustrated in FIG. 5 and the correction amount is within a predetermined range. In a similar manner to the case of the correction amount calculation unit 14 in the above-mentioned first Embodiment, the correction amount which is generated by the correction amount calculation unit 22 is represented by Formula 1.

In general, since an interpolation error of a position detector is specific to each position detector, a torque command error caused by the interpolation error is measured in advance for the position detector 11 which is provided in the motor control apparatus 1 before the calculation processing of a correction amount by the correction amount calculation unit 22. Although, for example, a torque command generated by the torque command generation unit 21 does not contain an oscillation in an ideal state in which a position detection error is not generated in the position detector 11, when the motor 2 is actually allowed to rotate by imparting a speed command for rotation at a constant speed, an oscillation caused by an interpolation error of the position detector 11 or a torque command error appears in a torque command output from the torque command generation unit 21. $g_n$ and $\varphi_n$ which reproduce the measured speed detection error are determined (Formula 1). The correction amount calculation unit 22 creates a correction amount by using the $g_n$ and $\varphi_n$. In the correction amount calculation unit 22, the number of sinusoidal waves which can be superposed is increased until the difference between the torque command error and the correction amount is within a predetermined range. More specifically, by increasing the natural number n in Formula 1 until the difference between the torque command error and the correction amount is within a predetermined range, sinusoidal waves in the Formula 1 are determined, and the sinusoidal waves are superposed to calculate the correction amount.

A correction processing unit 23 corrects a speed detection value by using a correction amount calculated by the correction amount calculation unit 22. For example, as illustrated in FIG. 5, the correction processing unit 23 reduces the torque command error by subtracting a correction amount created by superposing a plurality of sinusoidal waves from a torque command error caused by an interpolation error which is generated repeatedly in a cycle of $\lambda$.

The speed detection unit 12, the speed command generation unit 13, the torque command generation unit 21, the correction amount calculation unit 22, and the correction processing unit 23 may be constructed, for example, in a software program format, or may be constructed in a combination of a variety of electronic circuits and a software program. For example, when the speed detection unit 12, the speed command generation unit 13, the torque command generation unit 21, the correction amount calculation unit 22, and the correction processing unit 23 are constructed in a software program format, arithmetic processing units in the motor control apparatus 1 realize functions of the above-mentioned speed detection unit 12, speed command generation unit 13, torque command generation unit 21, correction amount calculation unit 22, and correction processing unit 23 by operating in accordance with the software program. The present invention can therefore be also applied to a motor control apparatus including an existing position detector by additionally installing software programs of the above-mentioned correction amount calculation unit 22, and correction processing unit 23 to the motor control apparatus.

Figure 6:
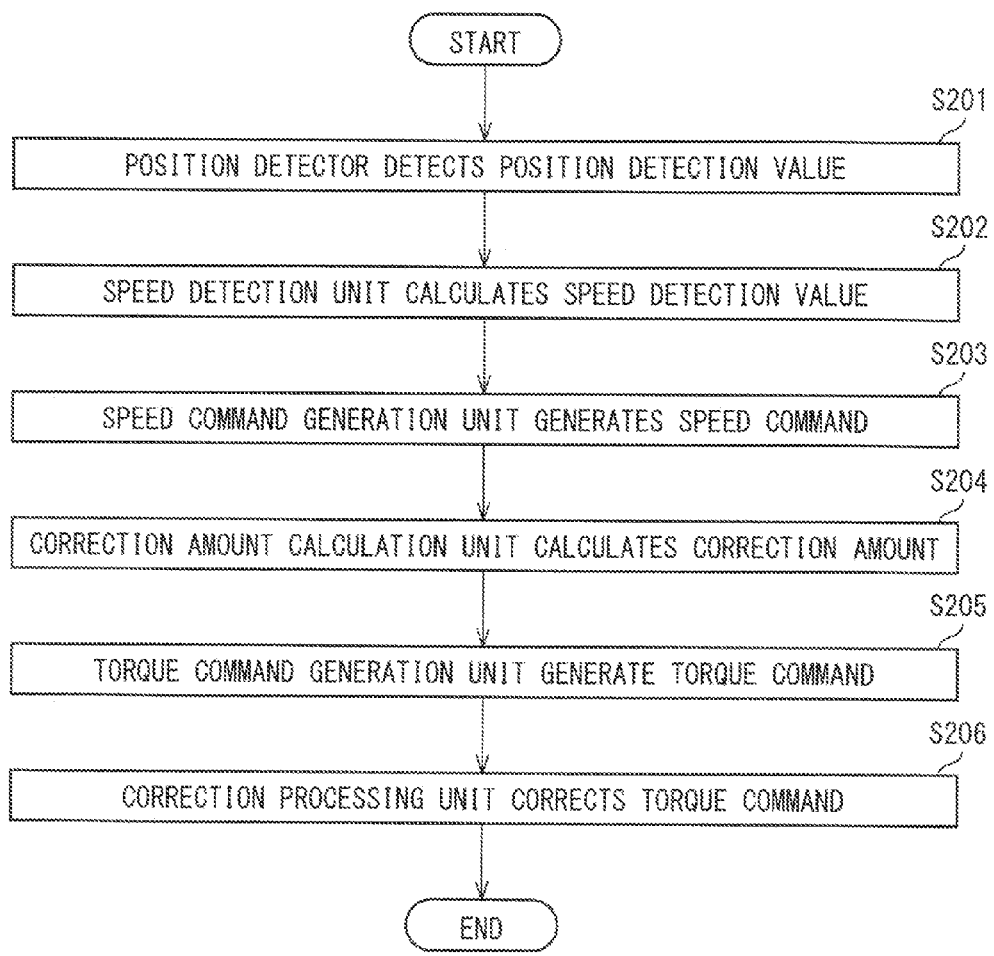
FIG. 6 is a flow chart illustrating an operational flow of a motor control apparatus 1 of the second Embodiment.

FIG. 6 is a flow chart illustrating an operational flow of the motor control apparatus 1 of the second Embodiment.

First, in a step S201, the position detector 11 detects the position of the rotor of the motor 2 which is rotationally driven based on a driving power which is supplied from the power converter 3.

Next, in a step S202, the speed detection unit 12 generates a speed detection value by differentiating a position detection value which is detected by the position detector 11. In a step S203, the speed command generation unit 13 generates a speed command which commands a rotation speed of the rotor of the motor 2. The step S203, and the step S201 and the step S202 may be conducted by changing the order thereof.

In a step S204, the correction amount calculation unit 22 calculates a correction amount based on a position detection value which is detected by the position detector 11.

In a step S205, the torque command generation unit 21 generates a torque command which commands a rotational torque of a motor based on the speed command and the speed detection value. The step S205 and the step S204 may be conducted by changing the order thereof.

Next, in a step S206, the correction processing unit 23 corrects the torque command by subtracting the correction amount from the torque command. By this, the torque command error is reduced. Since the motor 2 is allowed to rotate by a driving power which is output by the power converter 3 in which a power converting operation is controlled by the torque command after correction, a noise of the motor which is conventionally caused by an interpolation error is not generated.

The present invention can be applied to a motor control apparatus including a position detector for detecting the position of a rotor of a motor.

According to the present invention, a motor control apparatus which can stably control a motor even when a position detection error specific to a position detector varies can be realized.

According to the first Embodiment, a speed detection error caused by an interpolation error of a position detection value is reduced by correcting a speed detection value of a motor, and therefore an oscillation caused by an interpolation error of a phase detector is reduced in a torque command which is generated by using the speed detection value after correction. According to the second Embodiment, by correcting a torque command with respect to a motor, an oscillation caused by an interpolation error of a phase detector is reduced in the torque command after correction. Consequently, in any of the first and second Embodiments, a motor is allowed to rotate in accordance with a torque command in which an oscillation caused by an interpolation error is reduced, and therefore, a noise of a motor which is conventionally caused by an interpolation error of a phase detector is not generated.

According to the present invention, a correction amount calculation unit and a correction processing unit having functions related to a correction to a speed detection value of a motor or a correction to a torque command for a motor can be constructed in a software program format, and therefore, the present invention can be applied to a motor control apparatus including an existing position detector only by additionally installing software programs of the above-mentioned correction amount calculation unit, and correction processing unit to the motor control apparatus without a need to remodel an existing position detector.

The invention claimed is:

1. A motor control apparatus, comprising:
   a position detector for detecting the position of a rotor of a motor;
   a speed detection unit for calculating a speed detection value based on a position detection value detected by the position detector;
   a speed command generation unit for generating, a speed command which commands a rotation speed of the rotor of the motor;

a correction amount calculation unit for calculating a correction amount based on the position detection value detected by the position detector;

a correction processing unit directly coupled to the correction amount calculation unit and the speed detection unit for receiving the correction amount and the speed detection value, respectively, and the correction processing unit correcting the speed detection value by using the correction amount;

and a torque command generation unit for generating a torque command which commands a rotational torque of the motor based on the speed command and the speed detection value corrected by the correction processing unit, wherein the correction amount calculation unit calculates the correction amount by superposing a plurality of sinusoidal waves, and increasing a number of said plurality of superposed sinusoidal waves until the difference between a torque command error and the correction amount is within a predetermined range, and wherein each of the sinusoidal frequency components has a value which is a natural number times a basic frequency determined by a rotation frequency of the motor and a physical scale number of the position detector, and wherein the correction amount=$\Sigma_{n=1}^{m} g_n \sin(n\theta+\psi n)$, where each of m and n is a natural number ($1 \leq n \leq m$), gn is an amplitude component of an n-th harmonic, $\theta$ is the position detection value, and $\psi n$ is an initial phase of the n-th harmonic.

2. The motor control apparatus according to claim 1, wherein the correction amount calculation unit determines each of the sinusoidal waves which are synthesized in the calculation processing of a correction amount such that the difference between an error which is caused by an interpolation error for one rotation of the rotor which the position detector contains which is measured in advance and the correction amount is within a predetermined range.

3. A motor control apparatus, comprising:

a position detector for detecting the position of a rotor of a motor;

a speed detection unit for calculating a speed detection value based on a position detection value detected by the position detector;

a speed command generation unit for generating a speed command which commands a rotation speed of the rotor of the motor; a torque command generation unit for generating a torque command which commands a rotational torque of the motor based on the speed command and the speed detection value;

a correction amount calculation unit for calculating a correction amount based on the position detection value detected by the position detector;

and a correction processing unit for correcting the torque command by subtracting the correction amount, wherein the correction amount calculation unit calculates the correction amount by superposing a plurality of sinusoidal waves, and increasing a number of said plurality of superposed sinusoidal waves until the difference between a torque command error and the correction amount is within a predetermined range, and wherein each of the sinusoidal frequency components has a value which is a natural number times a basic frequency determined by a rotation frequency of the motor and a physical scale number of the position detector, wherein the correction amount=$\Sigma_{n=1}^{m} g_n \sin(n\theta+\psi n)$, where each of m and n is a natural number ($1 \leq n \leq m$), gn is an amplitude component of an n-th harmonic, $\theta$ is the position detection value, and $\psi n$ is an initial phase of the n-th harmonic.

4. The motor control apparatus according to claim 3, wherein the correction amount calculation unit determines each of the sinusoidal waves which are synthesized in the calculation processing of a correction amount such that the difference between an error which is caused by an interpolation error for one rotation of the rotor which the position detector contains which is measured in advance and the correction amount is within a predetermined range.

* * * * *